US009141268B2

(12) United States Patent
Watanabe et al.

(10) Patent No.: US 9,141,268 B2
(45) Date of Patent: Sep. 22, 2015

(54) INPUTTING APPARATUS AND STORAGE MEDIUM STORING PROGRAM

(75) Inventors: Toshinari Watanabe, Nagoya (JP);
Masaaki Wakizaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 637 days.

(21) Appl. No.: 12/698,078

(22) Filed: Feb. 1, 2010

(65) Prior Publication Data

US 2010/0194706 A1 Aug. 5, 2010

Related U.S. Application Data

(63) Continuation-in-part of application No. 12/648,093, filed on Dec. 28, 2009.

(30) Foreign Application Priority Data

Jan. 30, 2009 (JP) ................................ 2009-019023

(51) Int. Cl.
*G06F 3/041* (2006.01)
*G06F 3/0484* (2013.01)
(Continued)

(52) U.S. Cl.
CPC .......... *G06F 3/04847* (2013.01); *G06F 3/0488* (2013.01); *G06F 3/04855* (2013.01);
(Continued)

(58) Field of Classification Search
CPC .............. G06F 3/04847; G06F 3/0488; G06F 3/04855; G06F 3/04883; G06F 3/044; H04N 1/00448; H04N 1/00392; H04N 2201/0094; H04N 1/00442; H04N 1/00458
USPC ........................................................ 345/173
See application file for complete search history.

(56) References Cited

U.S. PATENT DOCUMENTS

| 5,526,023 A | 6/1996 | Sugimoto et al. |
| 5,877,758 A | 3/1999 | Seybold |

(Continued)

FOREIGN PATENT DOCUMENTS

| JP | H04-278627 A | 10/1992 |
| JP | H06-095796 A | 4/1994 |

(Continued)

OTHER PUBLICATIONS

The State Intellectual Property Office of the People's Republic of China, Notification of the First Office Action for Chinese Patent Application No. 200910265667.3 (counterpart to above-captioned patent application), issued Nov. 24, 2011.

(Continued)

*Primary Examiner* — Towfiq Elahi
(74) *Attorney, Agent, or Firm* — Baker Botts L.L.P.

(57) ABSTRACT

An inputting apparatus including: a detecting portion which detects an approach-touch area of a detecting area, the approach-touch area being an area detecting an approach or a touch of an input object; a first judging section which judges whether the approach-touch area has been moved in a direction other than a first direction in which the approach-touch area has initially started to be moved; a first-display-moving-amount determining section which determines, where the approach-touch area has been moved in the direction other than the first direction, a first display moving amount for moving an image to be displayed on a display portion, on the basis of a movement of the approach-touch area after the judgment of the first judging section; and a first-movement-display commanding section which provides a command for moving the image by the first display moving amount in a predetermined direction specified on the basis of the first direction.

14 Claims, 7 Drawing Sheets

(51) Int. Cl.
*G06F 3/0485* (2013.01)
*G06F 3/0488* (2013.01)
*H04N 1/00* (2006.01)

(52) U.S. Cl.
CPC ....... *H04N1/00392* (2013.01); *H04N 1/00442* (2013.01); *H04N 1/00448* (2013.01); *H04N 1/00458* (2013.01); *H04N 2201/0094* (2013.01)

(56) References Cited

U.S. PATENT DOCUMENTS

| | | | |
|---|---|---|---|
| 6,191,785 | B1 | 2/2001 | Bertram et al. |
| 6,222,541 | B1 | 4/2001 | Bates et al. |
| 7,479,948 | B2 * | 1/2009 | Kim et al. .................... 345/173 |
| 2002/0118386 | A1 | 8/2002 | Sakai |
| 2002/0176016 | A1 | 11/2002 | Misawa et al. |
| 2003/0142081 | A1 | 7/2003 | Iizuka et al. |
| 2004/0046887 | A1 | 3/2004 | Ikehata et al. |
| 2004/0128317 | A1 | 7/2004 | Sull et al. |
| 2004/0175764 | A1 * | 9/2004 | Nishiyama et al. ............ 435/7.2 |
| 2005/0226477 | A1 | 10/2005 | Tanaka |
| 2006/0048071 | A1 | 3/2006 | Jarrett et al. |
| 2006/0109259 | A1 * | 5/2006 | Ohta ............................ 345/173 |
| 2006/0284858 | A1 | 12/2006 | Rekimoto |
| 2007/0080953 | A1 | 4/2007 | Lii |
| 2007/0097245 | A1 | 5/2007 | Battles et al. |
| 2007/0247441 | A1 | 10/2007 | Kim et al. |
| 2007/0262965 | A1 | 11/2007 | Hirai et al. |
| 2007/0276525 | A1 | 11/2007 | Zadesky et al. |
| 2008/0046836 | A1 | 2/2008 | Maruyama et al. |
| 2008/0112005 | A1 | 5/2008 | Murray et al. |
| 2008/0165141 | A1 * | 7/2008 | Christie ........................ 345/173 |
| 2008/0297536 | A1 * | 12/2008 | Matsuno et al. .............. 345/684 |
| 2008/0301569 | A1 | 12/2008 | Akagi |
| 2009/0008161 | A1 * | 1/2009 | Jones et al. ................. 178/18.06 |
| 2010/0164991 | A1 | 7/2010 | Watanabe et al. |
| 2010/0167800 | A1 | 7/2010 | Wakizaka |
| 2010/0269038 | A1 | 10/2010 | Tsuda |
| 2011/0074707 | A1 | 3/2011 | Watanabe et al. |

FOREIGN PATENT DOCUMENTS

| | | |
|---|---|---|
| JP | H08-076926 A | 3/1996 |
| JP | 2006-268073 A | 10/2006 |
| JP | 2006-345209 A | 12/2006 |
| JP | 2008-299534 A | 12/2008 |

OTHER PUBLICATIONS

Japan Patent Office, Notification of Reason for Refusal for Japanese Patent Application No. 2008-334132 (counterpart to co-pending U.S. Appl. No. 12/648,093), mailed Dec. 21, 2010.
United States Patent and Trademark Office, Office Action for related U.S. Appl. No. 12/748,294, mailed Mar. 1, 2013.
United States Patent and Trademark Office, Office Action for related U.S. Appl. No. 12/648,093, mailed Mar. 20, 2012.
United States Patent and Trademark Office, Office Action for related U.S. Appl. No. 12/648,093, mailed Oct. 4, 2012.
European Patent Office; Extended European Search Report in European Patent Application No. 09252852.0 (counterpart to the above-captioned U.S. patent application) mailed Apr. 23, 2010.
Japan Patent Office, Decision of Refusal for Japanese Patent Application No. 2008-334132 (counterpart to above-captioned patent application), dispatched Mar. 15, 2011.

* cited by examiner

EXAMPLE OF LCD AND TOUCH PANEL

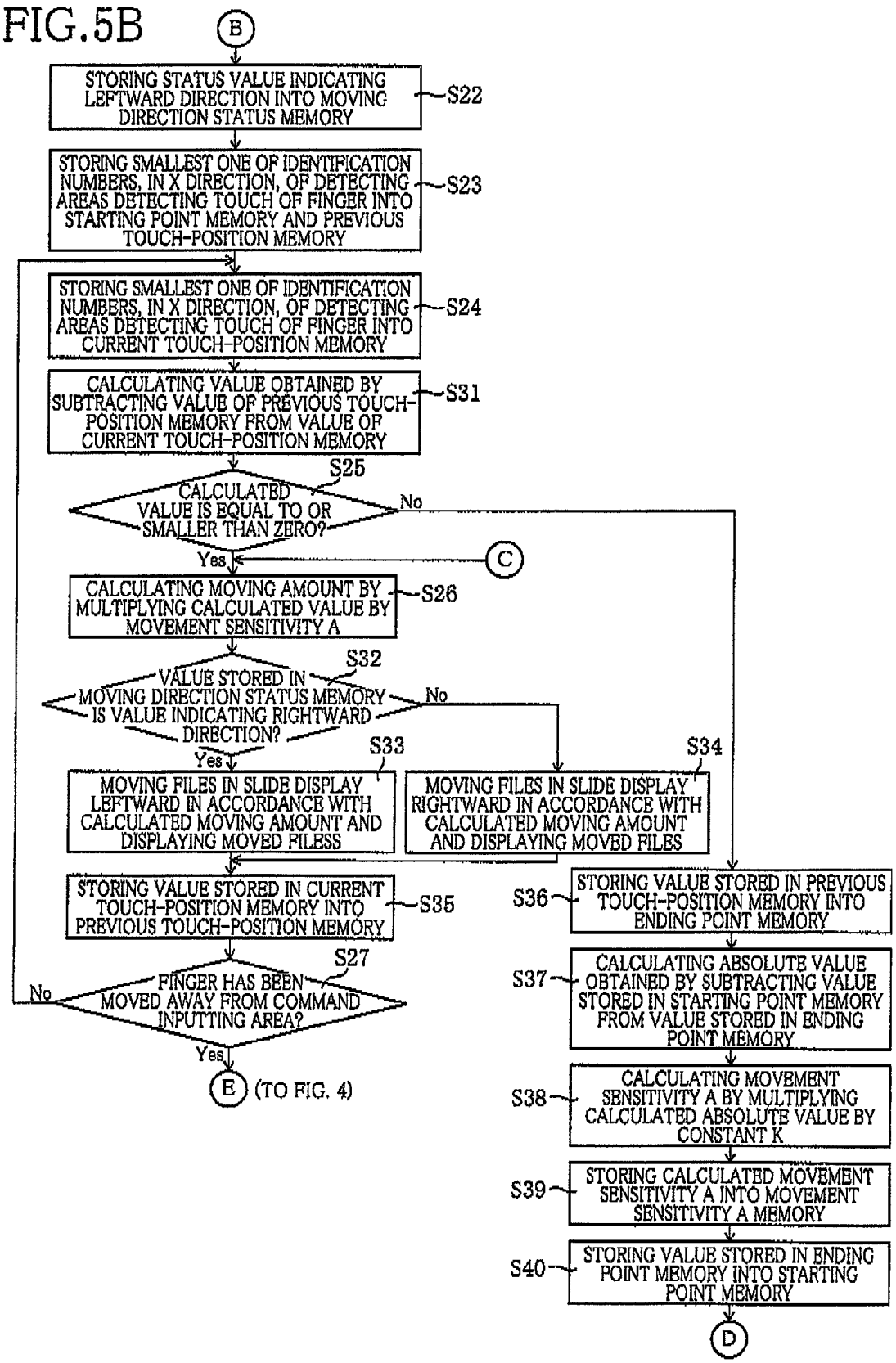

INPUTTING APPARATUS AND STORAGE MEDIUM STORING PROGRAM

INCORPORATION BY REFERENCE

This is a Continuation-In-Part application of U.S. patent application Ser. No. 12/648,093 filed on Dec. 28, 2009 entitled "INPUTTING APPARATUS." U.S. patent application Ser. No. 12/648,093 is herein incorporated by reference in its entirety including all references disclosed therein. The present application also claims priority from Japanese Patent Application No. 2009-019023, which was filed on Jan. 30, 2009, the disclosure of which is herein incorporated by reference in its entirety.

BACKGROUND OF THE INVENTION

1. Field of the Invention
The present invention relates to an inputting apparatus.
2. Description of the Related Art
There is known a pen input/output device in which where a user wants to change a date displayed on an input screen from "1992.7.17" to "1992.8.12", the user slides and reciprocates a stylus rightward and leftward in a state in which the stylus is touching an input area.

SUMMARY OF THE INVENTION

However, in the above-described device, although the date can be set ahead by sliding the stylus so as to reciprocate rightward and leftward in the state in which the stylus is touching the input area, it is difficult for the user to know how to operate the device where the user wants to set back the date, for example. That is, there is a problem that it is difficult to know an input method for commanding a direction in which display is changed.

This invention has been developed in view of the above-described situations, and it is an object of the present invention to provide an inputting apparatus in which a user can sensuously and easily input a slide direction and a slide amount.

The object indicated above may be achieved according to the present invention which provides an inputting apparatus comprising: a detecting portion configured to detect an approach-touch area of a detecting area, the approach-touch area being an area detecting an approach or a touch of an input object; a first judging section configured to judge whether the approach-touch area has been moved in a direction other than a first direction in which the approach-touch area has initially started to be moved or not; a first-display-moving-amount determining section configured to determine, where the first judging section has judged that the approach-touch area has been moved in the direction other than the first direction, a first display moving amount for moving an image to be displayed on a display portion, on the basis of a movement of the approach-touch area after the judgment of the first judging section; and a first-movement-display commanding section configured to provide a command for moving the image to be displayed on the display portion by the first display moving amount in a predetermined direction specified on the basis of the first direction.

The object indicated above may be achieved according to the present invention which provides a storage medium storing a program executed by an inputting apparatus including a detecting area configured to detect an approach or a touch of an input object, the program comprising: detecting an approach-touch area of the detecting area, the approach-touch area being an area detecting the approach or the touch of the input object; judging whether the approach-touch area has been moved in a direction other than a first direction in which the approach-touch area has initially started to be moved or not; determining, where the approach-touch area is judged to have been moved in the direction other than the first direction, a first display moving amount for moving an image to be displayed on a display portion, on the basis of a movement of the approach-touch area after the judgment that the approach-touch area has been moved in the direction other than the first direction; and providing a command for moving the image to be displayed on the display portion by the first display moving amount in a predetermined direction specified on the basis of the first direction.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which:

FIGS. 5A and 5B are flow-charts each partly showing the display updating processing of the MFP.

DESCRIPTION OF THE EMBODIMENT

Hereinafter, there will be described an embodiment of the present invention by reference to the drawings. There will be explained, respectively referring to FIGS. 1A and 1B, 2A and 2B, 3A-3D, 4-5B, and 6A and 6B, an external structure of a multi-function peripheral (MFP) 1, a hardware configuration of an inputting apparatus, an example of an operation method of the inputting apparatus, a display updating processing of the inputting apparatus, and an example of an operation method of a trackpad as the inputting apparatus.

On an upper front portion of the MFP 1 as the present embodiment, there are provided an LCD (a display portion) 16, a touch panel 17, and operational keys 15. A user can perform various settings and various controls of the MFP 1 by performing an inputting operation with the operational keys 15 or the touch panel 17.

In this MFP 1, where the user selects a desired one of a plurality of files or images (for example, a file for which the user wants to perform recording), a slide display of the files (in which the files are displayed so as to be slid) is performed on the LCD 16. The slide display is an operational display in which where all the files cannot be displayed at a time because the number of the files is too large, continuous display numbers are respectively added to all the files in order, and a predetermined number (e.g., six) of all the files which have continuous display numbers are displayed so as to be arranged in ascending order (or in descending order).

In this slide display, a certain number of displayed files are repeatedly replaced with or changed to other files of the certain number, whereby all the files can be displayed. In other words, in this slide display, all the files are displayed while the certain number of the files are replaced in each replacement. Further, in the slide display, each time when ones or all of the files which are being displayed are replaced with files whose display numbers are larger or smaller than those of the files being displayed, the files to be displayed at the next time are sorted in ascending order (or in descending order) and displayed on the LCD 16. Thus, each of the files is displayed so as to be moved or flowed on an operation screen.

Figure 1A:
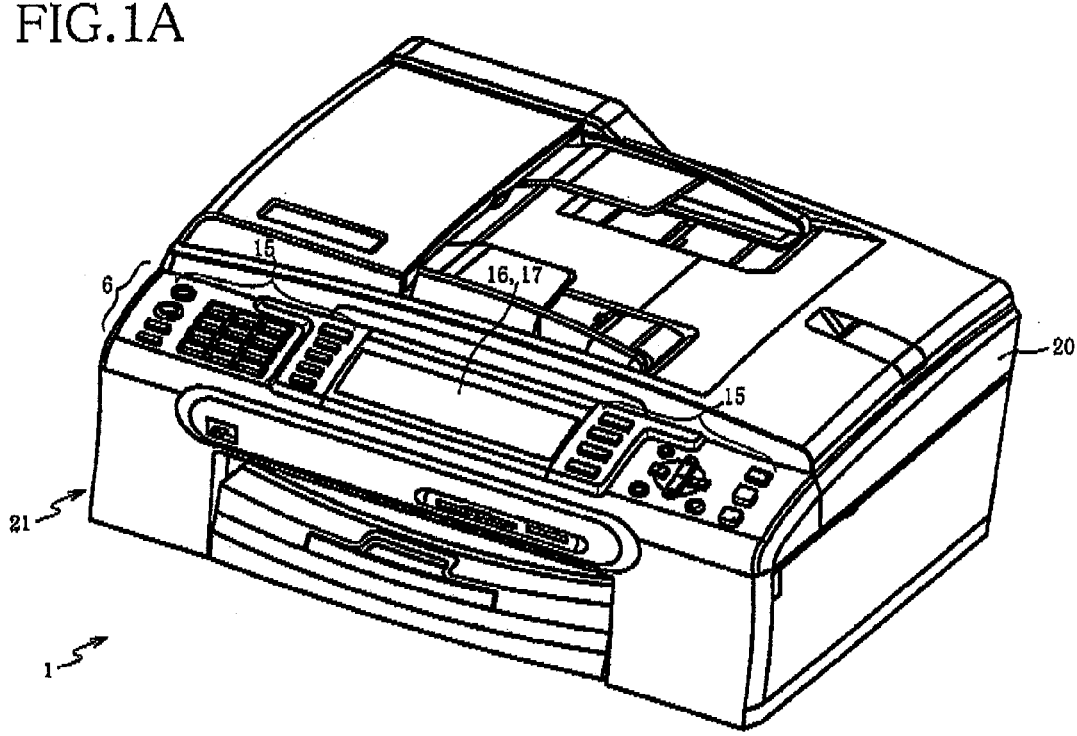
FIG. 1A is a perspective view showing an external structure of an MFP as an example of an inputting apparatus of the present invention.
Figure 1B:
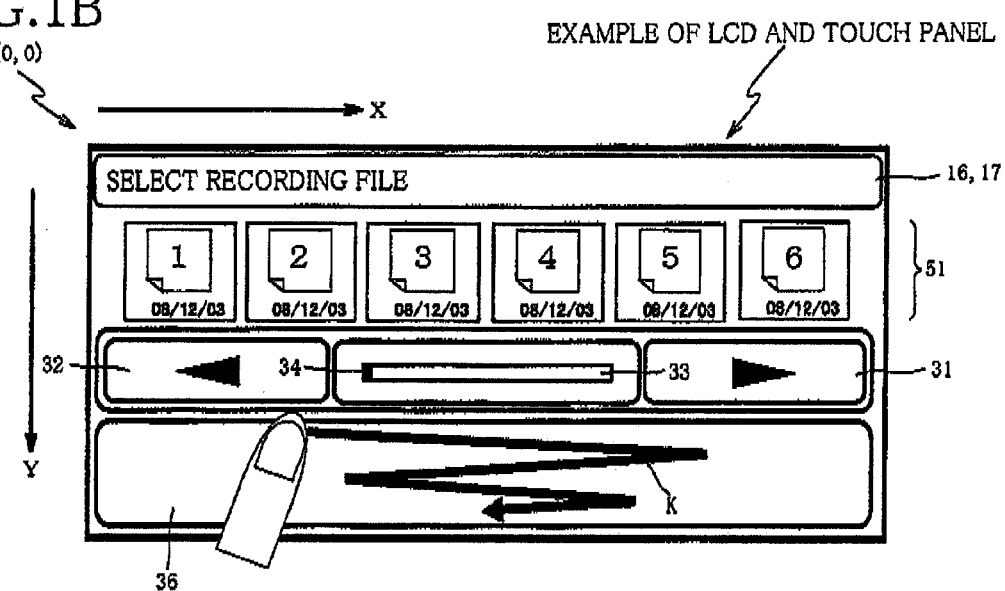
FIG. 1B is a schematic view showing an example of a slide display displayed on an LCD.

In this MFP 1, the user can sensuously adjust an amount of scroll (a scroll amount) of the files in the slide display by, as shown in FIG. 1B, reciprocating his or her finger(s) (that is, by alternately moving the finger rightward and leftward) in an X direction (in this embodiment, a lateral direction) in a state in which the finger is touching the touch panel 17.

Figure 2A:
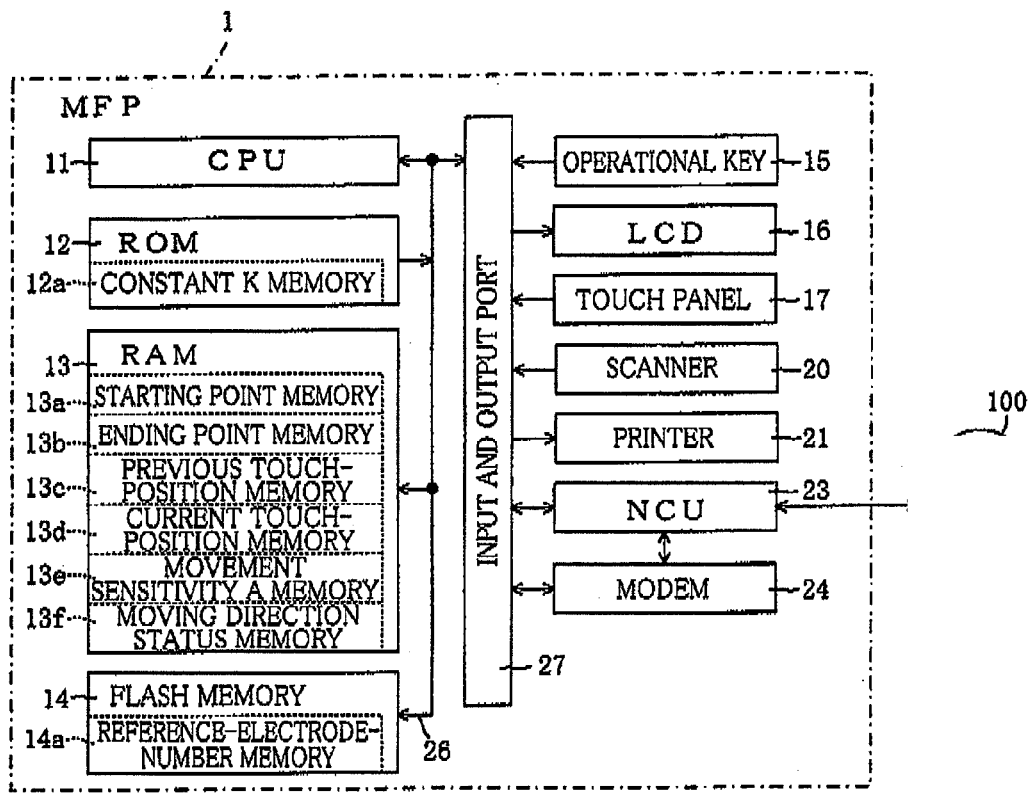
FIG. 2A is a block diagram showing an electric construction of the MFP.

The MFP 1 is configured to perform facsimile communication with an external device, not shown, connected via a phone-line network 100 (with reference to FIG. 2A). Further, this MFP 1 has various functions such as a printer function, a scanner function, and a copying function.

On an upper front portion of the MFP 1, there is provided an operational panel 6 having an elongated shape. This operational panel 6 is for operating the MFP 1 and is mainly provided with the operational keys 15, the LCD 16, and the touch panel 17. The user can set and control the various functions by operating various buttons of the operational keys 15 or by operating the touch panel 17.

On the LCD 16, there are displayed, e.g., a menu, an operational procedure, and a state of a processing currently being performed. The touch panel 17 as one type of the inputting apparatus is provided on a display screen of the LCD 16. Thus, touch of the user's finger on an image displayed on the LCD 16, e.g., an image of a key or a button (hereinafter may be referred to as "key image") means touch of the finger on the touch panel 17 provided on the display screen of the LCD 16.

Here, there will be explained, with reference to FIG. 1B, an example of the slide display displayed on the LCD 16 and a configuration of the touch panel 17. Initially, the slide display on the LCD 16 will be explained.

As shown in FIG. 1B, for example, in the slide display, there are displayed, in order from an upper side to a lower side of the LCD 16, a title of the operation screen, the predetermined number (e.g., six) of the files in a file displaying area 51 in which the files are displayed, a right scroll key 31, a left scroll key 32, a slide bar 33, a slider 34, and a command inputting area 36. It is noted that the slide bar 33 has a plurality of sections defined at predetermined pitches from one to the other of opposite ends of the slide bar 33, and the image data is assigned to each of the sections.

In the file displaying area 51 are displayed the predetermined number (e.g., six) of the files such that the display numbers of the respective files increase in order from a left end to a right end of the displayed files. It is noted that the display numbers of the respective files are added to the files being displayed in order to easily identify the display number of each file. That is, FIG. 1B shows a case in which the files having the respective display numbers 1-6 are being displayed.

Further, the command inputting area 36 represents a range in which where the user reciprocates his or her finger in the X direction (i.e., the lateral direction) in a state in which the user is touching the touch panel 17, the inputting operation is detected. It is noted that an arrow repeatedly bending in FIG. 1B shows an example of a path K in which the user's finger is moved.

There will be next explained the configuration of the touch panel 17. An entire surface of the touch panel 17 is minutely separated into a plurality of areas like a grid (for example, with 1 mm pitches), and an electrode (i.e., a sensor) for detecting the touch of the finger is provided in each of the areas (hereinafter, may be referred to as "detecting areas"). That is, the electrode functions as an approach-touch area which is an area detecting an approach or the touch. It is noted that each detecting area is sufficiently smaller than an area of the finger which touches the touch panel 17, and thus where the user's finger has touched the touch panel 17, a plurality of the detecting areas are touched by the finger.

Further, an identification number for identifying each detecting area is assigned to each detecting area. More specifically, the identification number (x, y) is assigned to each detecting area such that the numbers are successive in the X direction and an Y direction perpendicular to the X direction, with an identification number assigned to a leftmost and uppermost detecting area of the touch panel 17 being as an identification number (0, 0). It is noted that the identification numbers increase in the X direction and the Y direction.

In this touch panel 17, where the touch of the finger has been detected, all the identification numbers (x, y) of the detecting area(s) detecting the touch of the finger are specified. A CPU 11 (with reference to FIG. 2A) performs a processing corresponding to each image (e.g., a key image) being displayed on a position overlapping with the detecting area of the identification number (x, y) detected by the touch panel 17.

There will be next explained an electric construction of the MFP 1 with reference to FIG. 2A. The MFP 1 mainly includes the CPU 11, a ROM 12, a RAM 13, a flash memory 14, the operational keys 15, the LCD 16, the touch panel 17, a scanner 20, a printer 21, an NCU 23, and a modem 24.

The CPU 11, the ROM 12, the RAM 13, and the flash memory 14 are connected to each other via a bus line 26. Further, the operational keys 15, the LCD 16, the touch panel 17, the scanner 20, the printer 21, the NCU 23, the modem 24, and the bus line 26 are connected to each other via an input and output port 27.

The CPU 11 is configured to control the various functions of the MFP 1 and to control various portions of the MFP 1 which are connected to the input and output port 27, in accordance with fixed values and programs stored in the ROM 12, the RAM 13, and the flash memory 14, or in accordance with various signals transmitted and received via the NCU 23.

The ROM 12 is an unrewritable memory which stores, e.g., control programs performed in the MFP 1. The ROM 12 stores programs for executing or performing a display updating processing shown in flow-charts in FIGS. 4, 5A, and 5B, which will be described below.

Further, this ROM 12 includes a constant K memory 12a. The constant K memory 12a is a memory for storing a constant K. The constant K is a value used for a calculation of the display updating processing (with reference to FIGS. 5A and 5B) which will be described below.

The RAM 13 is a rewritable volatile memory for temporarily storing various data when various operations of the MFP 1 are performed. The RAM 13 includes a starting point memory 13a, an ending point memory 13b, a previous touch-position memory 13c, a current touch-position memory 13d, a movement sensitivity A memory 13e, and a moving direction status memory 13f.

The starting point memory 13a is a memory for storing, where the user reciprocates his or her finger in the X direction (i.e., the lateral direction) while touching the command inputting area 36, a value of "x" (hereinafter, may be referred to as a value x) of the identification number (x, y) of the detecting area functioning as a starting point of the movement in each of opposite directions of the X direction.

The ending point memory 13b is a memory for storing, where the user reciprocates his or her finger in the X direction while touching the command inputting area 36, the value x of the identification number (x, y) of the detecting area functioning as an ending point of the movement in each of the opposite directions of the X direction.

The previous touch-position memory 13c is a memory for storing, where the user reciprocates his or her finger in the X direction while touching the command inputting area 36, the value x of the identification number (x, y) of the detecting area at which the finger is previously positioned.

The current touch-position memory 13d is a memory for storing, where the user reciprocates his or her finger in the X direction while touching the command inputting area 36, the value x of the identification number (x, y) of the detecting area at which the finger is currently positioned.

The movement sensitivity A memory 13e is a memory for storing a movement sensitivity A. During the movement of the user's finger in the X direction in a state in which the user is touching the command inputting area 36 with the finger, the files are replaced (i.e., scrolled) in the slide display in accordance with this movement sensitivity A and an amount of the movement (i.e., a moving amount) of the user's finger.

This movement sensitivity A is updated each time when a direction of the movement (i.e., a moving direction) of the user's finger is changed during the reciprocation of the finger in the X direction (i.e., the lateral direction) in a state in which the user is touching the command inputting area 36. More specifically, when the moving direction of the finger has been changed, the movement sensitivity A is updated in accordance with a length of the path of the finger in the moving direction of the finger which has not been changed (i.e., in one of the opposite directions of the X direction).

The moving direction status memory 13f is a memory for storing a status value indicating whether a direction in which the finger has been moved initially is a rightward direction (i.e., one of the opposite directions of the X direction) or a leftward direction (i.e., the other of the opposite directions of the X direction), where the user is reciprocating his or her finger in the X direction while touching the command inputting area 36.

The flash memory 14 is a rewritable nonvolatile memory. Data stored in this flash memory 14 is kept also after the MFP 1 is turned off. The flash memory 14 includes a reference-electrode-number memory 14a. The reference-electrode-number memory 14a is a memory for storing, in advance as a reference electrode number, the number of the electrodes the user touches with his or her finger where the user operates the touch panel 17 in an ordinary manner.

Figure 2B:
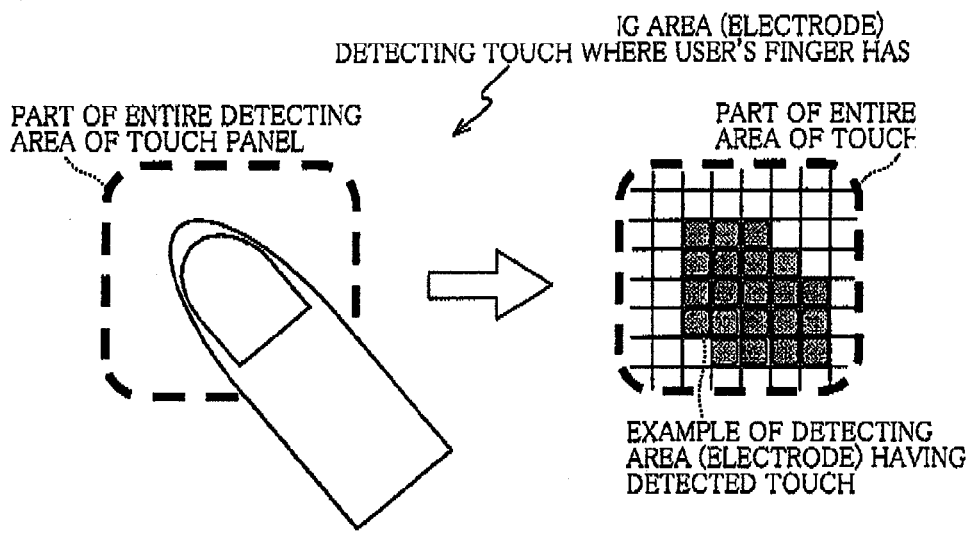
FIG. 2B is a schematic view for explaining an example of an electrode detecting a touch where a user's finger has touched a touch panel.

There will be next explained, with reference to FIG. 2B, an example of the electrode detecting the touch where the user's finger has touched the touch panel 17. It is noted that a size of each detecting area shown in FIG. 2B is different from an actual size of each detecting area because each detecting area shown in FIG. 2B is enlarged for an easier understanding purpose.

For example, in an initial setting of the MFP 1, the user is required to touch the touch panel 17 with one finger (e.g., an index finger) like in the case where the user usually operates the touch panel 17. Here, as shown in FIG. 2B, where the user touches the touch panel 17 in the ordinary manner, the electrode(s) the user is touching on the touch panel 17 with his or her finger is or are specified, and each of the detecting area(s) (the electrode(s)) the finger is touching on the touch panel 17 and the identification number of each detecting area are specified.

Then, the total number of the specified detecting area(s) (the electrode(s)) is calculated by the CPU 11 and stored as the reference electrode number into the reference-electrode-number memory 14a of the flash memory 14. In the present embodiment, an area (the number of the electrodes) of the touch of the user's finger using the MFP 1 is stored in advance, and the CPU 11 performs, on the basis of a value of this area or the number, a judgment whether the user has touched the command inputting area 36 with his or her finger or not (with reference to S2 in FIG. 4), a judgment whether the user has initially moved the finger in the rightward direction (i.e., in the one of the opposite directions of the X direction) or not (with reference to S3 in FIG. 4), and a judgment whether the user has initially moved the finger in the leftward direction (i.e., in the other of the opposite directions of the X direction) or not (with reference to S4 in FIG. 4). This improves the accuracy of the judgments.

That is, where the reference electrode number is set to a fixed value, the reference electrode number needs to be set to a relatively small value such that the CPU 11 can judge whether the user has touched the command inputting area 36 with his or her finger or not even where various users use the MFP 1, such as a user having a large finger, a user having a small finger, a user who strongly presses the command inputting area 36 (i.e., a user who presses with a large touch area), a user who lightly presses the command inputting area 36 (i.e., a user who presses with a small touch area).

Where the MFP 1 is thus configured, even where the user's finger has slightly touched or contacted the command inputting area 36 without the intention of operating, for example, there is a relatively high possibility that the CPU 11 misjudges that the user has touched the command inputting area 36 with his or her finger with the intention of operating. However, where the area of the touch of the finger of the user using the MFP 1 is stored in advance for each user, a reference value for each judgment can be set to an appropriate value for each user. This restrains the misjudgment, thereby improving the accuracy of the judgments.

There will be next explained an example of the operation method of the touch panel 17 with reference to FIGS. 3A-3D. In FIGS. 3A-3D, the path K of the finger shown in FIG. 1B is divided into four paths K1-K4 each extending in the lateral direction.

Figure 3A:
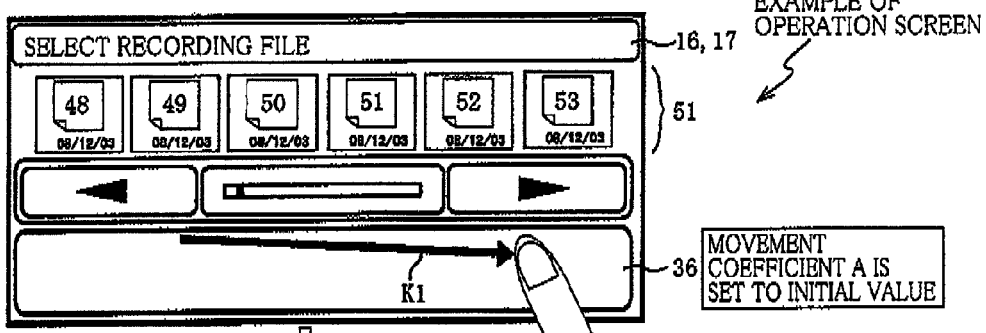
FIGS. 3A-3D are schematic views each for explaining an example of an operation method for operating a command inputting area of the slide display.

As shown in FIG. 3A, where the user moves his or her finger in the rightward direction (i.e., the one of the opposite direction of the X direction) from a state shown in FIG. 1B while touching the command inputting area 36, the files being displayed are replaced with the files having larger display numbers than the files being displayed, in accordance with the moving amount of the finger and a movement coefficient A. That is, the files are scrolled or moved in the leftward direction.

In the present embodiment, the CPU 11 determines whether the files are replaced with the files having larger or smaller display numbers (i.e., the CPU 11 determines a scrolling direction of the files being displayed) on the basis of a direction (i.e., the rightward direction or the leftward direction) in which the user has initially moved his or her finger, during the reciprocation of the user's finger in the X direction (i.e., the lateral direction) in a state in which the user is touching the command inputting area 36.

Specifically, where the user has initially moved his or her finger in the rightward direction, the files being displayed are replaced with the files having the larger display numbers. As a result, the files in the file displaying area 51 are scrolled in the leftward direction. On the other hand, where the user has initially moved his or her finger in the leftward direction, the files being displayed are replaced with the files having the smaller display numbers. As a result, the files in the file displaying area 51 are scrolled in the rightward direction. It is noted that even in the case where the direction in which the user has initially moved his or her finger does not coincide with the rightward direction or the leftward direction, where the direction in which the user has initially moved his or her finger includes a rightward direction component or a leftward direction component as a result of that the direction in which the user has initially moved his or her finger is divided into the rightward direction component or the leftward direction component, the direction in which the user has initially moved his or her finger is specified as the rightward direction component or the leftward direction component. As a result, a scroll direction of the files is determined as one of the rightward direction and the leftward direction on the basis of the direction in which the user has initially moved his or her finger.

Further, the movement coefficient A is set to an initial value until the moving direction of the finger has been changed after the user has touched the command inputting area 36. For example, where the user's finger has been moved from a starting end to an ending end of the path K1, files having display numbers "1-6" displayed in the file displaying area 51 are replaced with files having display numbers "48-53". As a result, forty-seven files are scrolled in the leftward direction in the file displaying area 51.

Figure 3B:
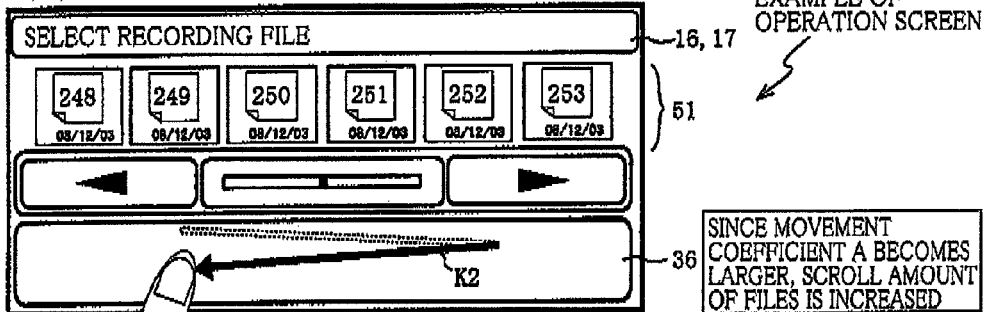

Then, as shown in FIG. 3B, where the user has moved his or her finger in the leftward direction (i.e., the other of the opposite directions of the X direction) from a state shown in FIG. 3A, the CPU 11 initially updates the movement coefficient A on the basis of a length (i.e., a first moving amount) of the path K1 of the finger in the direction in which the finger has been moved most recently, i.e., in the rightward direction (i.e., a length of the path K1 in the X direction). This movement coefficient A is set such that the longer the length of the path of the finger, the larger a value of the movement coefficient A becomes, while the shorter the length of the path of the finger, the smaller the value of the movement coefficient A becomes. The following explanation is provided assuming that the movement coefficient A is set to a value larger than the initial value.

Then, the files being displayed are scrolled in accordance with the updated movement coefficient A and the moving amount of the finger, but even where the moving direction of the finger becomes opposite to the direction in which the user has initially moved his or her the finger, the scroll direction of the files is not changed. For example, where the user's finger has moved from a starting end to an ending end of the path K2, files having display numbers "48-53" being displayed in the file displaying area 51 are replaced with files having display numbers "248-253". As a result, two hundred files are scrolled in the leftward direction in the file displaying area 51.

Figure 3C:
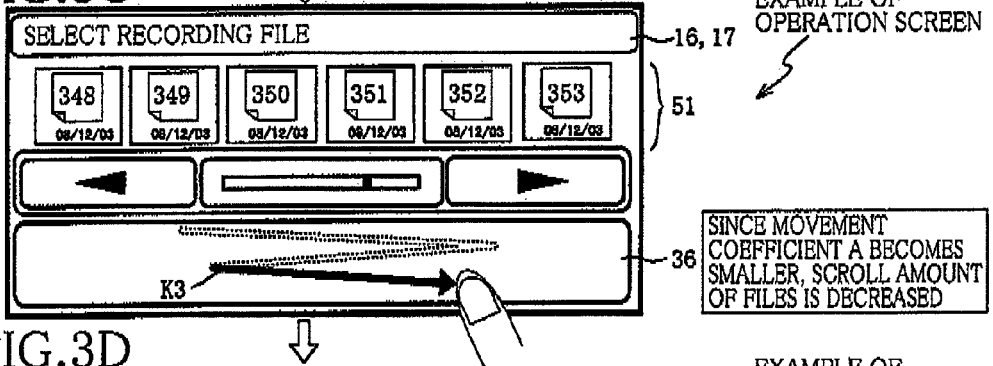

Likewise, then, as shown in FIG. 3C, where the user has moved his or her finger in the rightward direction (i.e., the one of the opposite direction of the X direction) from a state shown in FIG. 3B, the CPU 11 updates the movement coefficient A on the basis of a length of the path K2 of the finger in the direction in which the finger has been moved most recently, i.e., in the leftward direction (i.e., a length of the path K2 in the X direction). Since the length of the path K2 is smaller than that of the path K1, the movement coefficient A is set to a value smaller than in the case of the path K1.

Then, the files being displayed are scrolled in accordance with the updated movement coefficient A and the moving amount of the finger. For example, where the user's finger has moved from a starting end to an ending end of the path K3, files having display numbers "248-253" being displayed in the file displaying area 51 are replaced with files having display numbers "348-353". As a result, one hundred files are scrolled in the leftward direction in the file displaying area 51.

Figure 3D:
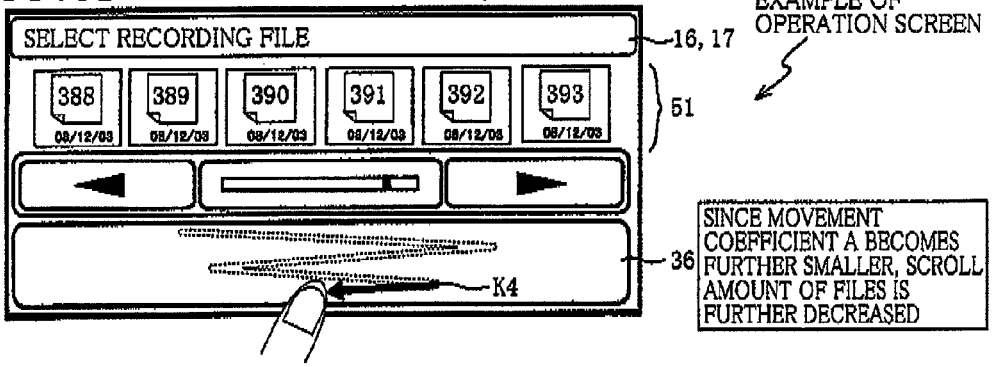

Then, as shown in FIG. 3D, where the user has moved his or her finger in the leftward direction (i.e., the other of the opposite directions of the X direction) from a state shown in FIG. 3C, the CPU 11 updates the movement coefficient A on the basis of a length of the path K3 of the finger in the direction in which the finger has been moved most recently, i.e., in the rightward direction (i.e., a length of the path K3 in the X direction). Since the length of the path K3 is smaller than that of the path K2, the movement coefficient A is set to a value smaller than that in the case of the path K2.

Then, the files being displayed are scrolled in accordance with the updated movement coefficient A and the moving amount of the finger, but even where the moving direction of the finger becomes opposite to the direction in which the user has initially moved his or her finger, the scroll direction of the files is not changed. For example, where the user's finger has moved from a starting end to an ending end of the path K4, files having display numbers "348-353" being displayed in the file displaying area 51 are replaced with files having display numbers "388-393". As a result, fifty files are scrolled in the leftward direction in the file displaying area 51.

As thus described, where the user wants to scroll the files in the slide display, the user may initially command, after touching the command inputting area 36, the scroll direction of the files by the moving direction of the finger, and then move his or her finger in the lateral direction (i.e., the X direction). Further, where the user wants to increase the scroll amount of the files after changing the moving direction of the finger, the user may lengthen the path of the finger in the current moving direction of the finger. On the other hand, where the user wants to decrease the scroll amount of the files after changing the moving direction of the finger, the user may shorten the path of the finger in the current moving direction of the finger. Thus, the user can sensuously adjust the scroll amount of the files in the slide display.

Further, having explained one example of the operation method of the command inputting area 36, the user may input the command by combining the inputting operation of the right scroll key 31, the left scroll key 32, the slide bar 33, or the slider 34, and the inputting operation of the command inputting area 36.

For example, where the number of all the files is large with respect to the number (e.g., six) of the files in the slide display, and thus a width of the slider 34 in the lateral direction is extremely small, it is difficult to display desired files by operating only the slider 34. In this case, where the user initially operates the slider 34, then displays the files near the desired files, and finally displays the desired files by performing the inputting operation in the command inputting area 36, the user can easily and speedily display the desired files in the file displaying area 51.

Figure 4:
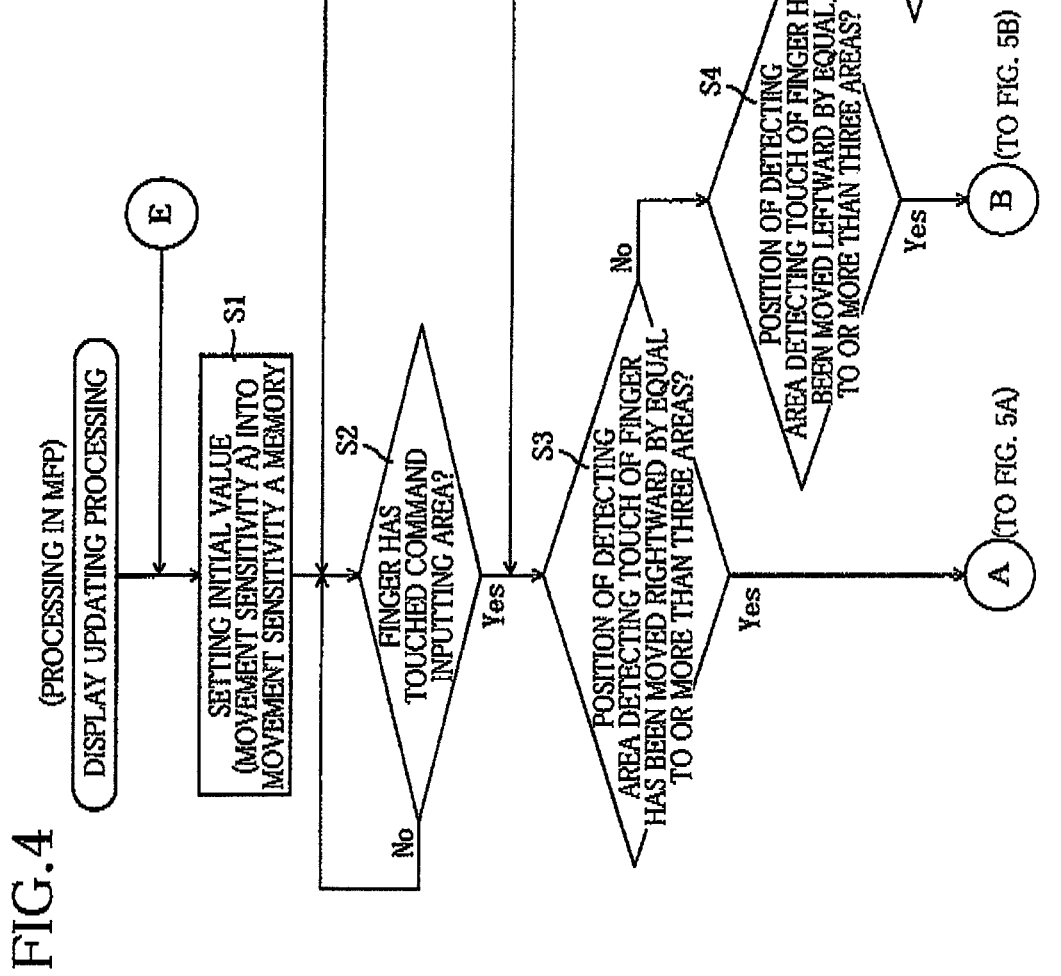
FIG. 4 is a flow-chart partly showing a display updating processing of the MFP.
Figure 5A:
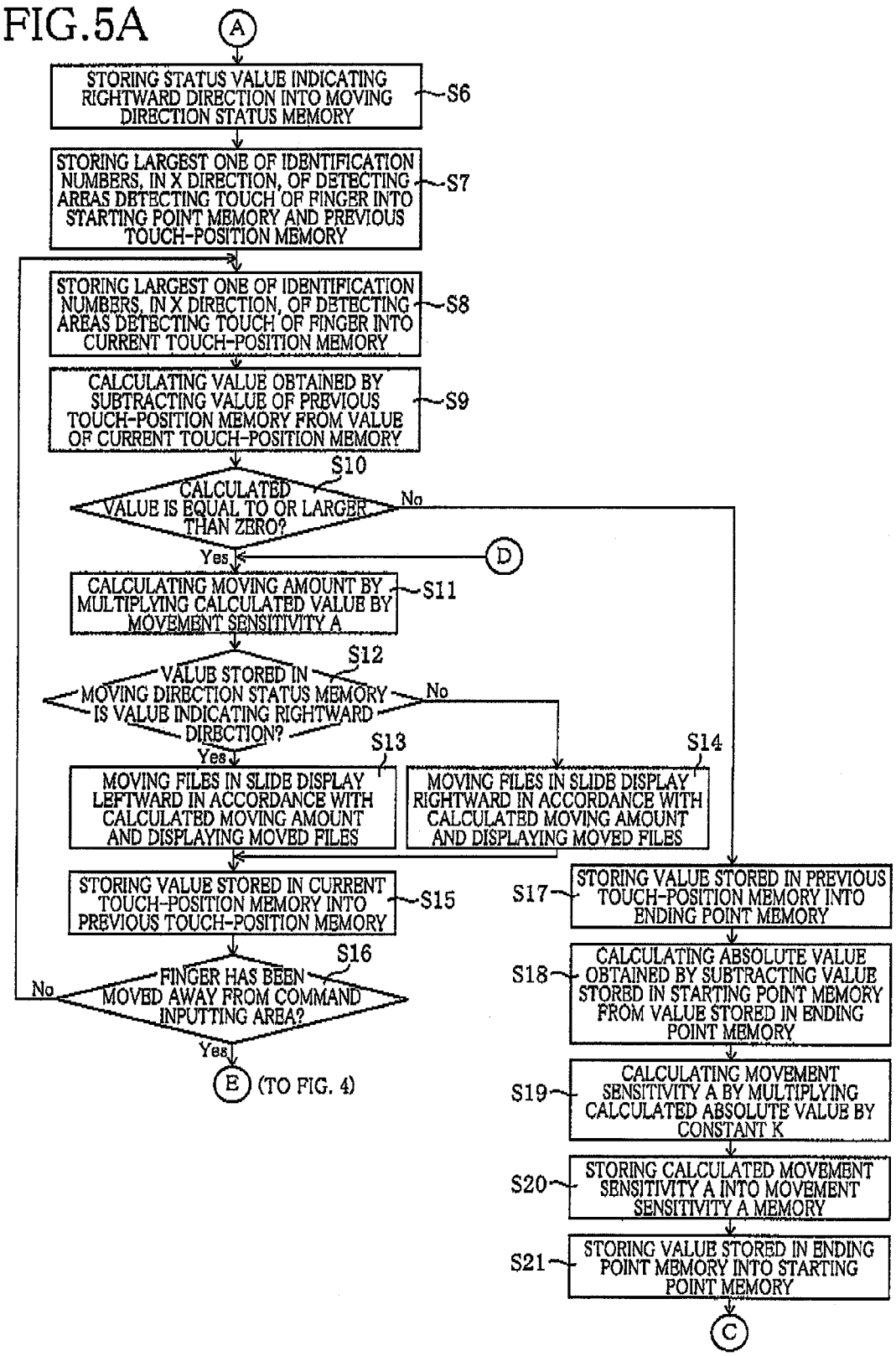

There will be next explained the display updating processing performed by the CPU 11 of the MFP 1 with reference to FIGS. 4, 5A, and 5B. This display updating processing is a processing for scrolling (i.e., displaying by replacing) the files being displayed in the slide display in accordance with the inputting operation of the use The display updating processing is repeatedly performed from turning on a main power of the MFP 1 until the main power is turned off.

As shown in FIG. 4, in this display updating processing, initially, in S1, the CPU 11 sets the initial value (i.e., the movement sensitivity A) into the movement sensitivity A memory 13e of the RAM 13. Then, the CPU 11 judges in S2 whether the user's finger has touched the command inputting area 36 or not. Where the CPU 11 has judged that the user's finger has not touched the command inputting area 36 (S2: No), the CPU 11 waits until the user's finger has touched the command inputting area 36.

For example, the CPU 11 judges that the user's finger has touched the command inputting area 36 where the CPU 11 has detected, in the command inputting area 36, the touch of the finger in detecting areas whose number is equal to or more than half the value (i.e., the number) stored in the reference-electrode-number memory 14a. Since the CPU 11 performs the judgment on the basis of the value according to the area (i.e., the number of the electrodes) of the touch of the finger of the user using the MFP 1, the CPU 11 can judge more accurately whether the user's finger has touched the command inputting area 36 or not, compared to the case in which the CPU 11 performs the judgment on the basis of the fixed value regardless of the user.

Where the CPU 11 has judged in S2 that the user's finger has touched the command inputting area 36 (S2: Yes), the CPU 11 judges in S3 whether a position of the detecting area(s) detecting the touch of the finger has been moved by equal to or more than three areas in the rightward direction (i.e., the one of the opposite direction of the X direction) in the command inputting area 36 or not.

It is noted that, in this flow-chart, a criterion of the judgment whether the position of the detecting area(s) detecting the touch of the finger has been moved is "three areas", but this value may be determined on the basis of the value stored in the reference-electrode-number memory 14a. For example, the CPU 11 judges that the position of the detecting area(s) detecting the touch of the finger has been moved, where the position of the detecting area(s) detecting the touch of the finger has been moved in the rightward direction by an area corresponding to a value one third of the value stored in the reference-electrode-number memory 14a. Since the judgment is performed on the basis of the value according to the area (i.e., the number of the electrodes) of the touch of the finger of the user using the MFP 1, the CPU 11 can accurately judge whether the position of the detecting area(s) detecting the touch of the finger has been moved or not, compared to the case in which the CPU 11 performs the judgment on the basis of the fixed value regardless of the user.

Where the CPU 11 has judged in S3 that the position of the detecting area(s) detecting the touch of the finger has been moved by equal to or more than three areas in the rightward direction (S3: Yes), the processing goes to S6 (with reference to FIG. 5A) which will be described below. On the other hand, where the CPU 11 has judged that the position of the detecting area(s) detecting the touch of the finger has not been moved by equal to or more than three areas in the rightward direction (S3: No), the CPU 11 judges in S4 whether the position of the detecting area(s) detecting the touch of the finger has been moved by equal to or more than three areas in the leftward direction (i.e., the other of the opposite directions of the X direction) in the command inputting area 36 or not.

Where the CPU 11 has judged in S4 that the position of the detecting area(s) detecting the touch of the finger has been moved by equal to or more than three areas in the leftward direction (S4: Yes), the processing goes to S22 (with reference to FIG. 5B) which will be described below. On the other hand, where the CPU 11 has judged that the position of the detecting area(s) detecting the touch of the finger has not been moved by equal to or more than three areas in the leftward direction (S4: No), the CPU 11 judges in S5 whether the user's finger has been moved away or is distant from the command inputting area 36 or not.

Where the CPU 11 has judged that the user's finger has not been moved away from the command inputting area 36 (S5: No), the processing returns to S3, and the processings of S3-S5 are repeated. On the other hand, where the CPU 11 has judged that the user's finger has been moved away from the command inputting area 36 (S5: Yes), the processing returns to S2, and the processings of S2-S5 are repeated.

The following processings will be explained with reference to FIGS. 5A and 5B. The CPU 11 stores, in S6, the status value indicating the rightward direction into the moving direction status memory 13f of the RAM 13. Then, the CPU 11 obtains in S7 the largest one of the identification numbers, in the X direction, of the respective detecting areas detecting the touch of the finger, and stores the obtained identification number into the starting point memory 13a and the previous touch-position memory 13c of the RAM 13.

Then, the CPU 11 obtains again in S8 the largest one of the identification numbers, in the X direction, of the respective detecting areas detecting the touch of the finger, and stores the obtained identification number into the current touch-position memory 13d of the RAM 13. Then, in S9, the CPU 11 calculates a value obtained by subtracting the value of the previous touch-position memory 13c from the value of the current touch-position memory 13d, and judges in S10 whether the calculated value is equal to or larger than zero or not.

Where the CPU 11 has judged that the calculated value is equal to or larger than zero (S10: Yes), the user's finger is moving in the rightward direction or stopped. In this case, the CPU 11 calculates in S11 the moving amount by multiplying the value calculated in S9 by the value (i.e., the movement sensitivity A) stored in the movement sensitivity A memory 13e.

Then, in S12, the CPU 11 judges whether the status value stored in the moving direction status memory 13f is the value indicating the rightward direction or not. Where the CPU 11 has judged that the status value is the value indicating the rightward direction (S12: Yes), the CPU 11 moves in S13 the files in the slide display in the leftward direction in accordance with the moving amount calculated in S11, and displays the moved files on the LCD 16. As a result, the files are scrolled in the leftward direction. It is noted that, the larger the calculated the moving amount, the larger the scroll amount is, while the smaller the calculated the moving amount, the smaller the scroll amount is.

On the other hand, where the CPU 11 has judged that the status value is a value indicating the leftward direction (S12: No), the CPU 11 moves in S14 the files in the slide display in the rightward direction in accordance with the moving amount calculated in S11, and displays the moved files on the LCD 16. As a result, the files are scrolled in the rightward direction. That is, in S13 and S14, each file is displayed such that a difference between the display number (or a page) of the file being displayed and a certain display number (or a certain page) of the file to be displayed becomes a predetermined difference.

Then, in S15, the CPU 11 stores the value stored in the current touch-position memory 13d, into the previous touch-position memory 13c, and judges in S16 whether the user's finger has been moved away or is distant from the command inputting area 36.

Where the CPU 11 has judged that the user's finger has not been moved away from the command inputting area 36 (S16: No), the processing returns to S8, and the processings of S8-S16 are repeated. On the other hand, where the CPU 11 has judged that the user's finger has been moved away from the command inputting area 36 (S16; Yes), the processing returns to S1 (with reference to FIG. 4), and the processings of S1-S16 are repeated.

Where the CPU 11 has judged in S10 that the calculated value is smaller than zero (S10: No), the user's finger has moved in the leftward direction. In this case, the CPU 11 stores in S17 the value stored in the previous touch-position memory 13c into the ending point memory 13b of the RAM 13, and calculates in S18 an absolute value obtained by subtracting the value stored in the starting point memory 13a from the value stored in the ending point memory 13b.

Then, in S19, the CPU 11 calculates the movement sensitivity A by multiplying the calculated absolute value by the value (i.e., the constant K) stored in the constant K memory 12a of the ROM 12. Then, the CPU 11 stores, in S20, the calculated movement sensitivity A into the movement sensitivity A memory 13e and stores in S21 the value stored in the ending point memory 13b into the starting point memory 13a, and the processing goes to S26.

In S22, the CPU 11 stores the status value indicating the leftward direction into the moving direction status memory 13f. Then, in S23, the CPU 11 obtains the smallest one of the identification numbers, in the X direction, of the respective detecting areas detecting the touch of the hunger, and stores the obtained identification number into the starting point memory 13a and the previous touch-position memory 13c.

Then, in S24, the CPU 11 obtains again, the smallest one of the identification numbers, in the X direction, of the respective detecting areas detecting the touch of the finger, and stores the obtained identification number into the current touch-position memory 13d. Then, the CPU 11 calculates in S31 a value obtained by subtracting the value of the previous touch-position memory 13c from the value of the current touch-position memory 13d, and judges in S25 whether the calculated value is equal to or smaller than zero or not.

Where the CPU 11 has judged that the obtained value is equal to or smaller than zero (S25: Yes), the user's finger is moving in the leftward direction or stopped. In this case, the CPU 11 calculates in S26 the moving amount by multiplying an absolute value of the value calculated in S31 by the value (i.e., the movement sensitivity A) stored in the movement sensitivity A memory 13e. Then, in S32, the CPU 11 judges whether the status value stored in the moving direction status memory 13f is the value indicating the rightward direction or not. Where the CPU 11 has judged that the status value is the value indicating the rightward direction (S32: Yes), the CPU 11 moves in S33 the files in the slide display in the leftward direction in accordance with the moving amount calculated in S26, and displays the moved files on the LCD 16. As a result, the files are scrolled in the leftward direction. It is noted that, the larger the calculated the moving amount, the larger the scroll amount is, while the smaller the calculated the moving amount, the smaller the scroll amount is. On the other hand, where the CPU 11 has judged that the status value is a value indicating the leftward direction (S32: No), the CPU 11 moves in S34 the files in the slide display in the rightward direction in accordance with the moving amount calculated in S26, and displays the moved files on the LCD 16. As a result, the files are scrolled in the rightward direction. That is, in S33 and S34, each file is displayed such that a difference between the display number (or a page) of the file being displayed and a certain display number (or a certain page) of the file to be displayed becomes a predetermined difference. Then, in S35, the CPU 11 stores the value stored in the current touch-position memory 13d, into the previous touch-position memory 13c.

Then, in S27, the CPU 11 judges whether the user's finger has been moved or is distant from the command inputting area 36. Where the CPU 11 has judged that the user's finger has not been moved away from the command inputting area 36 (S27: No), the processing returns to S24, and the processings of S24-S27 and S31-35 are repeated. On the other hand, where the CPU 11 has judged that the user's finger has been moved away from the command inputting area 36 (S27: Yes), the processing returns to S1 (with reference to FIG. 4), and the processings of S1-S27 and S31-35 are repeated.

Where the CPU 11 has judged in S25 that the obtained value is larger than zero (S25: No), the user's finger has been moved in the rightward direction. In this case, the CPU 11 stores in S36 the value stored in the previous touch-position memory 13c into the ending point memory 13b of the RAM 13, and calculates in S37 an absolute value obtained by subtracting the value stored in the starting point memory 13a from the value stored in the ending point memory 13b. Then, in S38, the CPU 11 calculates the movement sensitivity A by multiplying the calculated absolute value by the value (i.e., the constant K) stored in the constant K memory 12a of the ROM 12. Then, the CPU 11 stores in S39 the calculated movement sensitivity A into the movement sensitivity A memory 13e and stores in S40 the value stored in the ending point memory 13b into the starting point memory 13a, and the processing goes to S11.

In view of the above, the CPU 11 can be considered to include a first judging section which judges whether the approach-touch area has been moved in a direction other than a first direction in which the approach-touch area has initially started to be moved or not, and which performs the processings of S10 and S25. Further, the CPU 11 can be considered to include a first-display-moving-amount determining section which determines, where the first judging section has judged that the approach-touch area has been moved in the direction other than the first direction, a first display moving amount for moving the image to be displayed on the LCD 16, on the basis of a movement of the approach-touch area after the judgment of the first judging section, and which performs the processings of S18, S11, S37, and S26. Further, the CPU 11 can be considered to include a first-movement-display commanding section which provides a command for moving the image to be displayed on the LCD 16 by the first display moving amount in a predetermined direction specified on the basis of the first direction and for displaying the moved image, and which performs the processings of S14 and S33. Further, the CPU 11 can be considered to include a second-display-moving-amount determining section which determines a second display moving amount for moving the image to be displayed on the LCD 16, on the basis of a movement of the approach-touch area before the judgment of the first judging section that the approach-touch area has been moved in the direction other than the first direction, and which performs the processings of S9, S11, S31, and S26. Further, the CPU 11 can be considered to include a second-movement-display commanding section which provides a command for moving the image to be displayed on the LCD 16 by the second display moving amount in the predetermined direction and for displaying the moved image, and which performs the processings of S13 and S34.

By performing the display updating processing indicated by the flow-chart shown in FIGS. 4, 5A, and 5B, the CPU 11 can scroll (i.e., display by replacing) the files being displayed in the slide display where the user reciprocates or alternately moves rightward and leftward his or her finger in the X direction (i.e., the lateral direction) while touching the command inputting area 36.

Further, the CPU 11 determines the scroll direction of the files on the basis of the direction (i.e., the rightward direction or the leftward direction) in which the user has initially moved his or her finger, during the reciprocation of the user's finger in the X direction (i.e., the lateral direction) in a state in which the user is touching the command inputting area 36. Thus, after initially commanding the scroll direction, the user can continue to scroll the files in the same direction regardless of the moving direction of the finger.

In particular, in the cases such as the case in which the command inputting area 36 is relatively small and the case in which the number of all the files is relatively large, where the user reciprocates his or her finger in the lateral direction, the user can continue to scroll the files in the same direction regardless of whether the finger is moving in the one or the other of the opposite directions of the X direction. Thus, the user may not repeatedly slide or trace his or her finger in only one direction in the command inputting area 36. Thus, the inputting operation of the user is facilitated, thereby improving the usability of the MFP 1.

Further, the files in the slide display are scrolled only where the user has moved his or her finger in the X direction. Thus, for example, where the user moves his or her finger diagonally, the files can be scrolled more slowly compared to the case where the user moves his or her finger only in the lateral direction. Consequently, the user can sensuously adjust the scroll amount.

Further, where the user moves his or her finger in the X direction (i.e., the lateral direction) after touching the command inputting area 36, the scroll direction of the files can be determined, and the scroll of the files can be started. That is, the user can input two types of commands at a time by performing a series of operations in which the user moves his or her finger in the X direction after touching the command inputting area 36.

Further, the scroll amount according to the moving amount of the finger is determined on the basis of the length of the path of the finger in the direction in which the finger has been moved most recently (i.e., the length of the path in the X direction). Thus, where the user wants to increase the scroll amount, the user is only required to lengthen the path of the finger in the lateral direction, while where the user wants to decrease the scroll amount, the user is only required to shorten the path of the finger in the lateral direction. Thus, the user can sensuously adjust the scroll amount of the files in the slide display.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, in the present embodiment, the MFP 1 uses the touch panel 17 which detects the touch of the user's finger, but may use a touch panel which detects an approach of the user's finger. Specifically, there may be used a touch panel of a projected electrostatic capacitance type which uses a change of an electrostatic capacitance between the finger and the touch panel by an electrostatic bond between the finger and the touch panel which is caused when a tip of the finger has approached or touched the touch panel. Further, the MFP 1 may use a touch panel of a type in which the approach or the touch of the finger is detected by infrared radiation and/or an electric field.

Further, in the display updating processing of the present embodiment, with reference to S10 and S25 respectively shown in FIGS. 5A and 5B, the CPU 11 judges whether the moving direction of the finger has been reversed or not by comparing (a) the position of the detecting area(s) having previously detected the touch of the finger (i.e., the value x of the identification number) and (b) the position of the detecting area(s) currently detecting the touch of the finger (i.e., the value x of the identification number). However, the MFP 1 may be configured such that where the moving direction of the finger is the rightward direction, the CPU 11 stores the largest value x of the identification numbers (x, y) of the respective detecting areas having detected the touch after the moving direction of the finger becomes the rightward direction, and where the largest value x of the identification numbers of the respectively detecting areas currently detecting the touch of the finger becomes smaller than the stored largest value x, the CPU 11 judges that the moving direction of the finger has been reversed or becomes the leftward direction. Likewise, the MFP 1 may be configured such that where the moving direction of the finger is the leftward direction, the CPU 11 stores the smallest value x of the identification numbers (x, y) of the respective detecting areas having detected the touch after the moving direction of the finger becomes the leftward direction, and where the smallest value x of the identification numbers of the respectively detecting areas currently detecting the touch of the finger becomes larger than the stored smallest value x, the CPU 11 judges that the moving direction of the finger has been reversed or becomes the rightward direction.

Further, in the present embodiment, where the user has moved his or her finger while touching the command inputting area 36, only a distance in which the user has moved his or her finger in the X direction (i.e., the lateral direction) is set as the moving amount of the finger, but, instead of this configuration, this MFP 1 may be configured such that all a distance in which the user's finger has been slid or traced (e.g., diagonally) is set as the moving amount of the finger.

Figure 6A:
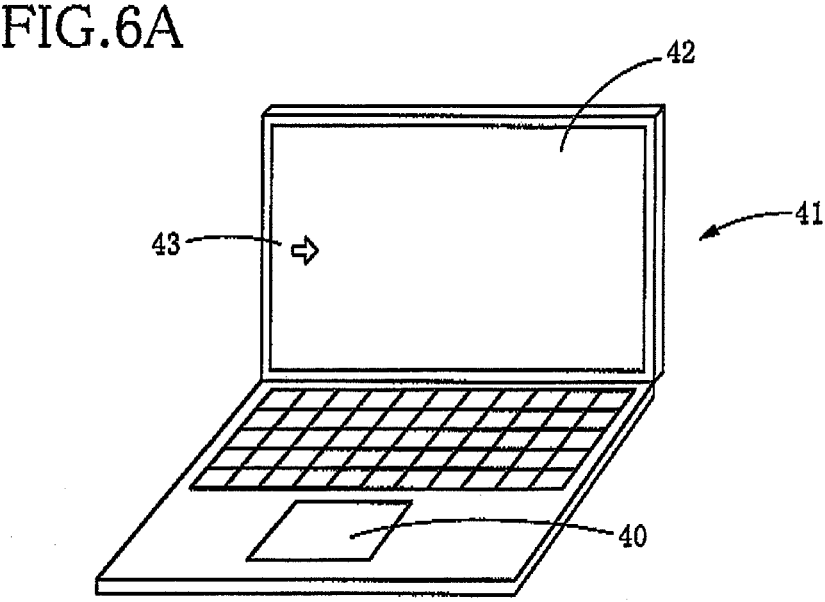
FIG. 6A is a schematic view showing a laptop computer including a trackpad as an inputting apparatus to which the present invention is applied.
Figure 6B:
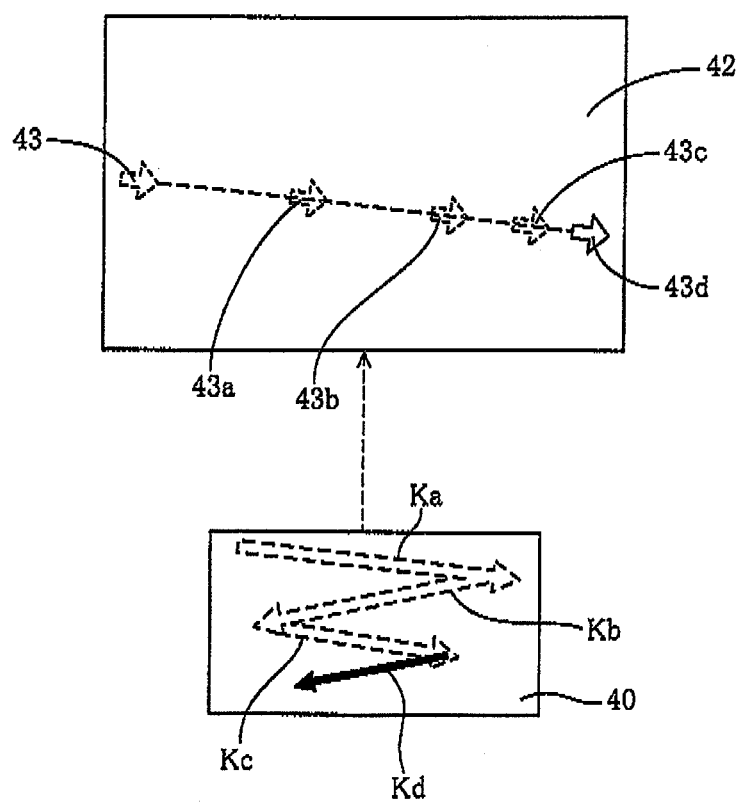
FIG. 6B is a view for explaining a relationship between a movement of a cursor on a display and a path of the finger on the trackpad.

It is noted that, in the above-described embodiment, the present invention has been explained as the inputting apparatus for changing the order of the files being displayed on the LCD 16, but the present invention is not Drafted to this configuration. For example, the present invention may be embodied as an inputting apparatus for changing a position at which a cursor (i.e., a pointing device or a position specifying portion) displayed on the screen of the LCD 16. Hereinafter, there will be explained a concrete example with reference to FIGS. 6A and 6B. FIG. 6A is a schematic view showing a laptop computer 41 including a trackpad 40 as an inputting apparatus to which the present invention is applied. The laptop computer 41 includes a display 42 configured to display an image. In FIG. 6A, on the display 42 is displayed a cursor 43 for specifying a position in the display 42 or a predetermined image displayed on the display 42. There will be explained an input method of this laptop computer 41 with reference to FIG. 6B. FIG. 6B is a view for explaining a relationship between a movement of the cursor 43 on the display 42 and a path of the finger on the trackpad 40. Where the user moves his or her finger rightward and downward from a state in which the finger has initially touched the trackpad 40, a moving direction of the finger is specified as a moving direction of the cursor 43. The cursor 43 is moved in the specified moving direction to a cursor 43a by a path Ka of the finger, to a cursor 43*b* by a path Kb, to a cursor 43*c* by a path Kc, and to a cursor 43*d* by a path Kd. A moving amount of the cursor 43 is determined on the basis of (a) a length of a path before a moving amount of the finger and the moving direction of the finger have been changed (a length of the path Ka where the finger is being moved along the path Kb) and (b) a current moving amount of the finger (a moving amount in the path Kb where the forger is being moved along the path Kb). Also in this configuration, the user can move the cursor 43 in a direction desired by the user by, e.g., reciprocating his or her finger while touching the trackpad 40.

Further, in the above-described embodiment, the scroll direction of the files is determined by the movement of the user's finger from the state in which the user has initially touched the command inputting area 36, and the files are scrolled in accordance with the moving amount in which the finger has been moved from the state in which the user has initially touched the command inputting area 36, but the present invention is not limited to this configuration. For example, the MFP 1 may be configured such that, where the finger has been moved from the state in which the user has initially touched the command inputting area 36, only the determination of the scroll direction of the files is performed without scrolling the files. In this case, the scroll of the files can be determined, after the scroll direction is determined, on the basis of a scroll amount after the user has changed the moving direction of the finger.

Further, in the above-described embodiment, where the user has changed the moving direction of the finger from the rightward direction to the leftward direction, the movement coefficient A is updated on the basis of the length of the path of the finger in the movement in the rightward direction, and the movement coefficient A is set to the larger value in accordance with the longer length of the path of the finger and set to the smaller value in accordance with the shorter length of the path of the finger, but the present invention is not limited to this configuration. For example, the MFP 1 may be configured such that the movement coefficient A is set to a larger value in accordance with a shorter length of the path of the finger and set to a smaller value in accordance with a longer length of the path of the finger. Where the MFP 1 is thus configured, the user can speedily change the order of the files displayed on the LCD 16 in a relatively large scroll amount by reciprocating the finger such that the length of the path of the finger becomes relatively short, whereby desired files can be speedily displayed.

Further, in the above-described embodiment, the scroll direction and the scroll amount are determined by the reciprocation of the user's finger in the rightward and leftward direction, and the files or the cursor is moved and displayed, but the present invention is not limited to this configuration. For example, the MFP 1 may be configured such that the moving direction of the files or the cursor is determined as the leftward direction by the movement of the user's finger in the rightward direction. Further, the MFP 1 may be configured such that the files or the cursor is moved, during the movement of the user' a finger in a state in which the finger is touching the command inputting area 36, by an operation after the determination, which operation is different from the reciprocation of the user's finger, e.g., a movement of the user's finger repeatedly drawing a circle or a rectangle on the command inputting area 36. Where the MFP 1 is thus configured, the user does not need to repeatedly slide his or her finger on the command inputting area 36 only in one direction because the user does not need to move his or her finger away from the command inputting area 36, and thus the user does not need to perform an operation in which the user repeatedly slides his or her finger on the command inputting area 36 only in one direction. Consequently, the input operation of the user can be facilitated, and there can be reduced a frequency of occurrences of a hitting sound occurred at a position at which the finger hits or touches the command inputting area 36.

What is claimed is:

1. An inputting apparatus comprising:
    a display device;
    a touch panel that provides a slide-detection area; and
    one or more processors that determine a first-initial-moving direction of an image displayed on the display device based on a first linear slide movement in a first direction when the first linear slide movement of an input object in the first direction on the touch panel in the slide-detection area is detected, the first linear slide movement of the input object being an initial linear slide movement of the input object in which the input object slides on the touch panel when a touch state between the input object and the touch panel is initiated,
    wherein the one or more processors move the image in the first-initial-moving direction determined by the one or more processors in response to the first linear slide movement of the input object by a first moving amount on the basis of a moving amount of the input object in the first linear slide movement; and
    wherein the one or more processors move the image in the first-initial-moving direction, in which the image has been moved by the first linear slide movement, in response to a second slide movement of the input object by a second moving amount on the basis of a moving amount of the input object in the second slide movement, the second slide movement of the input object being a slide movement of the input object in which the input object slides in a second direction on the touch panel in the slide-detection area while the touch state is continuously maintained from the first linear slide movement, the second direction being a direction other than the first direction,
    wherein the one or more processors determine a second-initial-moving direction of the image displayed on the display device based on a third linear slide movement in a third direction when the input object touches the slide-detection area on the touch panel again, after the input object separates from the slide-detection area on the touch panel in a middle of a movement of the image in the first-initial-moving direction executed by the one or more processors, and the third linear slide movement of the input object in the third direction on the touch panel in the slide-detection area is detected,
        the third linear slide movement being an initial linear slide movement of the input object on the touch panel in the same area as the slide-detection area where the first linear slide movement and the second slide movement are detected when the touch state is initiated,
        the third direction being a direction opposite to the first direction, and
        the second-initial-moving direction being a direction opposite to the first-initial-moving direction,
    wherein the one or more processors move the image in the second-initial-moving direction determined by the one or more processors in response to the third slide movement of the input object by a third moving amount on the basis of a moving amount of the input object in the third slide movement; and
    wherein the one or more processors move the image in the second-initial-moving direction, in which the image has been moved by the third slide movement, in response to a fourth slide movement of the input object by a fourth moving amount on the basis of a moving amount of the input object in the fourth slide movement, the fourth slide movement of the input object being a slide movement of the input object in which the input object slides in a fourth direction on the touch panel in the slide-detection area while the touch state is continuously maintained from the third slide movement, the fourth direction being a direction other than the third direction.

2. The inputting apparatus according to claim 1, wherein the one or more processors determine, when a direction in which the image displayed on the display device is moved has been defined, the defined direction as the first-initial-moving direction and the second-initial-moving direction.

3. The inputting apparatus according to claim 1, wherein the one or more processors detect a moving amount of the input object in a direction the same as the first-initial-moving direction and determine the first moving amount on the basis of the moving amount in the direction the same as the first-initial-moving direction.

4. The inputting apparatus according to claim 1, wherein the one or more processors detect the moving amount of the slide movement of the input object in a direction opposite to the first-initial-moving direction and determine the second moving amount on the basis of the moving amount in the direction opposite to the first-initial-moving direction.

5. The inputting apparatus according to claim 1, wherein the one or more processors determine the first direction as the first-initial-moving direction.

6. The inputting apparatus according to claim 5, wherein the image to be moved and displayed on the display device is a cursor which specifies a specific position on the display device.

7. The inputting apparatus according to claim 1, wherein the one or more processors make the second moving amount larger in a situation in which the first moving amount is larger than in a situation in which the first moving amount is small.

8. The inputting apparatus according to claim 1, wherein the display device displays an image constituted by a plurality of images respectively having display numbers arranged in a predetermined order, and wherein the one or more processors display, by moving the displayed image by the first moving amount, an image having a display number different from that of the image previously displayed.

9. The inputting apparatus according to claim 8, wherein the display device displays an image corresponding to a certain display number, and wherein the one or more processors determine the first moving amount such that a display number difference between the image to be displayed on the display device and the image corresponding to the certain display number becomes a predetermined difference.

10. The inputting apparatus according to claim 1, wherein the display device displays an image constituted by a plurality of images respectively corresponding to a plurality of pages arranged in a predetermined order, and wherein the to one or more processors display, by moving the displayed image by the first moving amount, an image corresponding to a page different from that of the image previously displayed.

11. The inputting apparatus according to claim 10, wherein the one or more processors determine the first moving amount such that a page difference between a page of the image to be displayed on the display device and a certain page being displayed on the display device becomes a predetermined difference.

12. The inputting apparatus according to claim 11, wherein the one or more processors make the first moving amount larger in a situation in which the predetermined difference is large than in a situation in which the predetermined difference is small.

13. The inputting apparatus according to claim 10, wherein the display device displays a slide bar having a rod shape which is disposed on the touch panel, which has an entire length representing a total page number of the image, and which has a plurality of sections defined at predetermined pitches from one to the other of opposite ends of the slide bar, wherein the image is assigned to each of the sections, and wherein the one or more processors move, when the touch panel detects the input object in an area of the slide bar, the image until an image is displayed on the display device, the image assigned to one of the plurality of sections that corresponds to a position of the touch panel having been detected.

14. A non-transitory storage medium storing a program executed by one or more processors of an inputting apparatus including a display device and a touch panel that provides a slide-detection area, the program being causing the one or more processors to:
determine a first-initial-moving direction of an image displayed on the display device based on a first linear slide movement in a first direction when the first linear slide movement of an input object in the first direction on the touch panel in the slide-detection area is detected, the first linear slide movement of the input object being an initial linear slide movement of the input object in which the input object slides on the touch panel when a touch state between the input object and the touch panel is initiated;
move the image in the first-initial-moving direction determined by the one or more processors in response to the first linear slide movement of the input object by a first moving amount on the basis of a moving amount of the input object in the first linear slide movement;
move the image in the first-initial-moving direction, in which the image has been moved by the first linear slide movement, in response to a second slide movement of the input object by a second moving amount on the basis of a moving amount of the second slide movement, the second slide movement of the input object being a slide movement of the input object in which the input object slides in a second direction on the touch panel in the slide-detection area while the touch state is continuously maintained from the first linear slide movement, the second direction being a direction other than the first direction,
determine a second-initial-moving direction of the image displayed on the display device based on a third linear slide movement in a third direction when the input object touches the slide-detection area on the touch panel again, after the input object separates from the slide-detection area on the touch panel in a middle of a movement of the image in the first-initial-moving direction executed by the one or more processors, and the third linear slide movement of the input object in the third direction on the touch panel in the slide-detection area is detected,
the third linear slide movement being an initial linear slide movement of the input object in the same area as the slide-detection area where the first linear slide movement and the second slide movement are detected when the touch state is initiated, the third direction being a direction opposite to the first direction, and the second-initial-moving direction being a direction opposite to the first-initial-moving direction;

move the image in the second-initial-moving direction determined by the one or more processors in response to the third slide movement of the input object by a third moving amount on the basis of a moving amount of the third slide movement; and move the image in the second-initial-moving direction, in which the image has been moved by the third slide movement, in response to a fourth slide movement of the input object by a fourth moving amount on the basis of a moving amount of the fourth slide movement, the fourth slide movement of the input object being a slide movement of the input object in which the input object slides in a fourth direction on the touch panel in the slide-detection area while the touch state is continuously maintained from the third slide movement, the fourth direction being a direction other than the third direction.

* * * * *